(12) United States Patent
Zorzella et al.

(10) Patent No.: US 9,128,789 B1
(45) Date of Patent: Sep. 8, 2015

(54) EXECUTING CROSS-CUTTING CONCERNS FOR CLIENT-SERVER REMOTE PROCEDURE CALLS

(71) Applicant: Google Inc., Mountain View, CA (US)

(72) Inventors: Luiz Otavio Zorzella, Sunnyvale, CA (US); Alexander Vladimirov, San Francisco, CA (US); Neal Kanodia, Mountain View, CA (US); Chris Hibbert, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/955,255

(22) Filed: Jul. 31, 2013

Related U.S. Application Data (60) Provisional application No. 61/677,562, filed on Jul. 31, 2012.

(51) Int. Cl.
*G06F 9/54* (2006.01)

(52) U.S. Cl.
CPC ..................................... *G06F 9/547* (2013.01)

(58) Field of Classification Search
None
See application file for complete search history.

(56) References Cited

U.S. PATENT DOCUMENTS

| | | | |
|---|---|---|---|
| 6,530,841 B2 | 3/2003 | Bull et al. | |
| 6,811,084 B2 | 11/2004 | Tatsuta et al. | |
| 6,874,140 B1 * | 3/2005 | Shupak | 717/131 |
| 7,275,994 B2 | 10/2007 | Eck et al. | |
| 7,435,179 B1 | 10/2008 | Ford | |
| 7,491,123 B2 | 2/2009 | Smith | |
| 7,564,469 B2 | 7/2009 | Cohen | |
| 7,946,919 B2 | 5/2011 | Piccionelli | |
| 7,970,749 B2 | 6/2011 | Uhlir et al. | |
| 8,002,617 B1 | 8/2011 | Uskela et al. | |
| 8,070,608 B2 | 12/2011 | Uhlir et al. | |
| 8,108,459 B1 | 1/2012 | Hoffman et al. | |
| 8,190,733 B1 | 5/2012 | Hoffman et al. | |
| 8,267,794 B2 | 9/2012 | Van Luchene | |
| 8,287,383 B1 | 10/2012 | Etter et al. | |
| 8,291,016 B1 | 10/2012 | Whitney et al. | |
| 8,308,568 B2 | 11/2012 | Amaitis et al. | |
| 8,366,446 B2 | 2/2013 | Kreiner et al. | |
| 2001/0009867 A1 | 7/2001 | Sakaguchi et al. | |
| 2002/0090985 A1 | 7/2002 | Tochner et al. | |

(Continued)

FOREIGN PATENT DOCUMENTS

| | | |
|---|---|---|
| EP | 1574238 | 9/2005 |
| EP | 2101889 | 9/2009 |

(Continued)

OTHER PUBLICATIONS

Matyas, "Playful Geospatial Data Acquisition by Location-Based Gaming Communities", The International Journal of Virtual Reality, 2007, vol. 6, No. 3, pp. 1-10.

*Primary Examiner* — Tuan Dao
(74) *Attorney, Agent, or Firm* — Dority & Manning, P.A.

(57) ABSTRACT

Systems and methods for implementing cross-cutting actions that cut across many remote procedure calls (RPCs) in an interactive application, such as location-based parallel reality game are provided. In particular, one or more decorators can be associated in a source file, such as a Java source file, with a remote procedure call class defining a plurality of RPC methods for the interactive application. Each decorator can be a set of instructions that gets executed before and after an RPC method and addresses concerns that cut across a plurality of RPC methods for the interactive application.

18 Claims, 5 Drawing Sheets

(56) References Cited

U.S. PATENT DOCUMENTS

| | | |
|---|---|---|
| 2003/0036428 A1 | 2/2003 | Aasland |
| 2003/0224855 A1 | 12/2003 | Cunningham |
| 2004/0029625 A1 | 2/2004 | Annunziata |
| 2004/0058732 A1 | 3/2004 | Piccionelli |
| 2004/0255268 A1 | 12/2004 | Meijer et al. |
| 2005/0049022 A1 | 3/2005 | Mullen |
| 2006/0105838 A1 | 5/2006 | Mullen |
| 2006/0258420 A1 | 11/2006 | Mullen |
| 2006/0281553 A1 | 12/2006 | Hawkins et al. |
| 2006/0284789 A1 | 12/2006 | Mullen |
| 2006/0287026 A1 | 12/2006 | Mullen |
| 2007/0021166 A1 | 1/2007 | Mattila |
| 2007/0033291 A1* | 2/2007 | Prevost .................. 709/238 |
| 2007/0060408 A1 | 3/2007 | Schultz et al. |
| 2007/0083933 A1* | 4/2007 | Venkatapathy et al. ........ 726/25 |
| 2007/0104348 A1 | 5/2007 | Cohen |
| 2007/0149284 A1 | 6/2007 | Plavetich et al. |
| 2007/0281765 A1 | 12/2007 | Mullen |
| 2007/0281766 A1 | 12/2007 | Mullen |
| 2008/0015018 A1 | 1/2008 | Mullen |
| 2008/0015024 A1 | 1/2008 | Mullen |
| 2008/0146338 A1 | 6/2008 | Bernard et al. |
| 2009/0005140 A1 | 1/2009 | Rose et al. |
| 2009/0013128 A1* | 1/2009 | Peterson .................. 711/113 |
| 2009/0017913 A1 | 1/2009 | Bell et al. |
| 2009/0024986 A1 | 1/2009 | Meijer et al. |
| 2009/0281851 A1 | 11/2009 | Newton et al. |
| 2010/0287011 A1 | 11/2010 | Muchkaev |
| 2010/0318978 A1* | 12/2010 | Nikolov et al. .................. 717/148 |
| 2010/0331089 A1 | 12/2010 | Priebatsch et al. |
| 2011/0004658 A1 | 1/2011 | Chesley et al. |
| 2011/0081973 A1 | 4/2011 | Hall |
| 2011/0319148 A1 | 12/2011 | Kinnebrew et al. |
| 2012/0040745 A1 | 2/2012 | Auterio et al. |
| 2012/0052953 A1 | 3/2012 | Annambhotla et al. |
| 2012/0094770 A1 | 4/2012 | Hall |
| 2012/0157210 A1 | 6/2012 | Hall |
| 2012/0185892 A1 | 7/2012 | Camplejohn et al. |
| 2012/0190452 A1 | 7/2012 | Weston et al. |
| 2012/0214568 A1* | 8/2012 | Herrmann .................. 463/16 |
| 2012/0226627 A1 | 9/2012 | Yang |
| 2012/0231887 A1 | 9/2012 | Lee et al. |
| 2012/0233258 A1 | 9/2012 | Vijayaraghavan et al. |
| 2012/0246104 A1 | 9/2012 | Di Sciullo et al. |
| 2012/0315992 A1 | 12/2012 | Gerson et al. |
| 2013/0004932 A1 | 1/2013 | Mahajan et al. |
| 2013/0005475 A1 | 1/2013 | Mahajan et al. |
| 2013/0005480 A1 | 1/2013 | Bethke et al. |
| 2013/0072308 A1 | 3/2013 | Peck et al. |
| 2013/0117326 A1 | 5/2013 | De Smet et al. |
| 2013/0178257 A1 | 7/2013 | Langseth |

FOREIGN PATENT DOCUMENTS

| | | |
|---|---|---|
| EP | 2393056 | 12/2011 |
| EP | 2416289 | 2/2012 |
| WO | WO 02/062436 | 8/2002 |

* cited by examiner

EXECUTING CROSS-CUTTING CONCERNS FOR CLIENT-SERVER REMOTE PROCEDURE CALLS

PRIORITY CLAIM

The present application claims the benefit of priority of U.S. Provisional Patent Application Ser. No. 61/677,562, titled Executing Cross-Cutting Concerns for Client-Server Remote Procedure Calls, filed Jul. 31, 2012, which is incorporated herein by reference for all purposes.

FIELD

The present disclosure relates generally to executing remote procedure call methods in a distributed computing environment, and more particularly, to systems and methods for executing cross-cutting actions across multiple client-server remote procedure call methods in an interactive application, such as a location-based parallel reality game.

BACKGROUND

In interactive applications such as multiplayer games, many activities associated with the interactive application can be taking place simultaneously. For example, in interactive applications implemented across a distributed computing system (e.g. a client-server architecture), client devices may need to periodically connect with a server to perform various actions and obtain updates to the status of the interactive application. For instance, in the context of a location-based parallel reality game, game modules running on client devices used by players to play the game may need to make remote procedure calls (RPCs) to invoke certain program elements, methods, and/or services (i.e. execute RPC methods) on a game server to return results to the game module.

For certain client-server RPC methods, it can be desirable to implement cross-cutting actions at the server that cut across multiple different RPC methods, regardless of the actual intent or content of the call. For example, in a location-based parallel reality game where player movement in the parallel virtual world is based on player position in the real world, any time the client contacts the game server, the game server should record the location of the client. For certain of these cross-cutting concerns, the client must always provide certain information to the server to enable the action. For instance, the client must provide its location. For other actions, no additional information is required. For example, the server can record the time at which the client last connected, which requires no additional information from the client.

Due to the large volume of RPC methods that need to be executed in an interactive application, it can become impractical and error-prone to explicitly add cross-cutting actions to the implementation of every new RPC method. In addition, as new cross-cutting actions are added, it can be impractical and error prone to scan the code base for all existing RPC methods and to add the new cross-cutting actions to every existing RPC method.

SUMMARY

Aspects and advantages of embodiments of the invention will be set forth in part in the following description, or may be obvious from the description, or may be learned through practice of the embodiments.

One exemplary aspect of the present disclosure is directed to a computer-implemented method of executing cross-cutting actions across a plurality of remote procedure calls in an interactive application, such as a location-based parallel reality game. The method includes processing a source file defining a remote procedure call class specifying a plurality of remote procedure call methods. The source file includes a decorator annotation annotating the remote procedure call class with one or more decorators such that each of the one or more decorators applies to each of a plurality of remote procedure call methods specified in the remote procedure call class. Each of the one or more decorators specifies a cross-cutting action for the interactive application. The method further includes executing the cross-cutting actions specified in each of the decorators in conjunction with executing one of the plurality of remote procedure call methods specified in the remote procedure call class.

Other exemplary implementations of the present disclosure are directed to systems, apparatus, non-transitory computer-readable media, and devices implementing cross-cutting actions during remote procedure calls in a distributed computing system used to implement an interactive application.

These and other features, aspects and advantages of various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment to yield a still further embodiment. Thus, it is intended that aspects of the present disclosure cover such modifications and variations.

Overview

Generally, the present disclosure is directed to systems and methods for executing cross-cutting actions that cut across many remote procedure calls (RPCs) in an interactive application, such as location-based parallel reality game. The present disclosure will be discussed with reference to executing cross-cutting concerns in conjunction with RPC methods used in a location-based parallel reality game for purposes of illustration and discussion. Those of ordinary skill in the art, using the disclosures provided herein, should understand that the systems and methods for executing cross-cutting actions can be used in any application involving RPCs.

According to aspects of the present disclosure, one or more decorators can be associated in a source file, such as a Java source file, with a remote procedure call class defining a plurality of RPC methods for the interactive application. As used herein, a "decorator" is a set of instructions that gets executed in conjunction with an RPC method, such as before and after an RPC method. According to aspects of the present disclosure, decorators can be used to address cross-cutting actions that cut across a plurality of RPC methods for the interactive application. As used herein, a cross-cutting action is any process, action, or method that is performed in association with a plurality of different RPC methods.

In one embodiment, the decorators can be used to execute cross-cutting actions associated with a location-based parallel reality game any time a client device used by a player of the parallel reality game invokes an RPC method at a game server implementing the location-based parallel reality game. For example, in a location-based parallel reality game, a player's position in a parallel virtual world associated with the parallel reality game can depend on the player's position in the real world. In that regard, a game server needs to record a client's position information every time the client connects with the game server. A decorator can be used to implement this cross-cutting action, such that every time a client invokes an RPC method at the game server, the server records location information associated with the client. Other exemplary cross-cutting actions that can be executed across a plurality of RPCs in a location-based parallel reality game can include recording the time at which the client last connected, updating player energy based on the actions associated with the RPC method, updating player damage, verifying log in information, methods directed to security and authentication, and other methods.

In a particular implementation, the one or more decorators can be specified as decorator classes in a source file. A decorator class can be associated with a particular RPC class by specifying the decorator class as a parameter of a decorator annotation (e.g. @DecorateWith) annotating the RPC class in the source file. The decorator annotation can contain any number of decorator classes as desired. During processing, each of the decorators specified as decorator classes in the decorator annotation will be executed in conjunction with an RPC method specified in the decorated RPC class. The decorated RPC class can have any number of RPC methods and each decorator will be applied to all the methods in the class. As a result, a new cross-cutting action can be added to multiple RPC methods specified in a particular RPC class by simply adding a decorator class to the decorator annotation annotating the RPC class in the source file. Similarly, all the decorators in the decorator annotation would automatically be applied to a new RPC method added to the RPC class. In this manner, the subject matter of the present disclosure has a technical effect of allowing for the improved and efficient application of many cross-cutting actions to many RPC methods in an interactive application, such as a location-based parallel reality game.

Each decorator class can specify a before method to be executed before an RPC method and an after method to be executed after an RPC method. The before method can be annotated in the source file with a suitable annotation (e.g. @Before) and the after method can be annotated in the source file with a suitable annotation (e.g. @After). During execution, the before methods associated with each decorator in the decorator annotation can be executed first. An RPC method defined in the RPC class can then be executed. Finally, the after methods associated with each decorator in the decorator annotation can be executed. In one implementation, an asynchronous data store query can be initiated during the before method and can be completed during the after method. This allows for multiple operations to be happening in parallel during a particular RPC method, leading to more efficient processing.

Exemplary Location-Based Parallel Reality Gaming System

Exemplary computer-implemented location-based gaming systems implementing decorators to address cross-cutting actions that cut across a plurality of RPC methods according to exemplary embodiments of the present disclosure will now be set forth. The present subject matter will be discussed with reference to an interactive parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other distributed computing systems. In addition, the inherent flexibility of computer-based systems allows for a great variety of possible configurations, combinations, and divisions of tasks and functionality between and among the components of the system. For instance, the systems and methods for executing cross-cutting actions according to aspects of the present disclosure can be implemented using a single computing device or across multiple computing devices.

Figure 1:
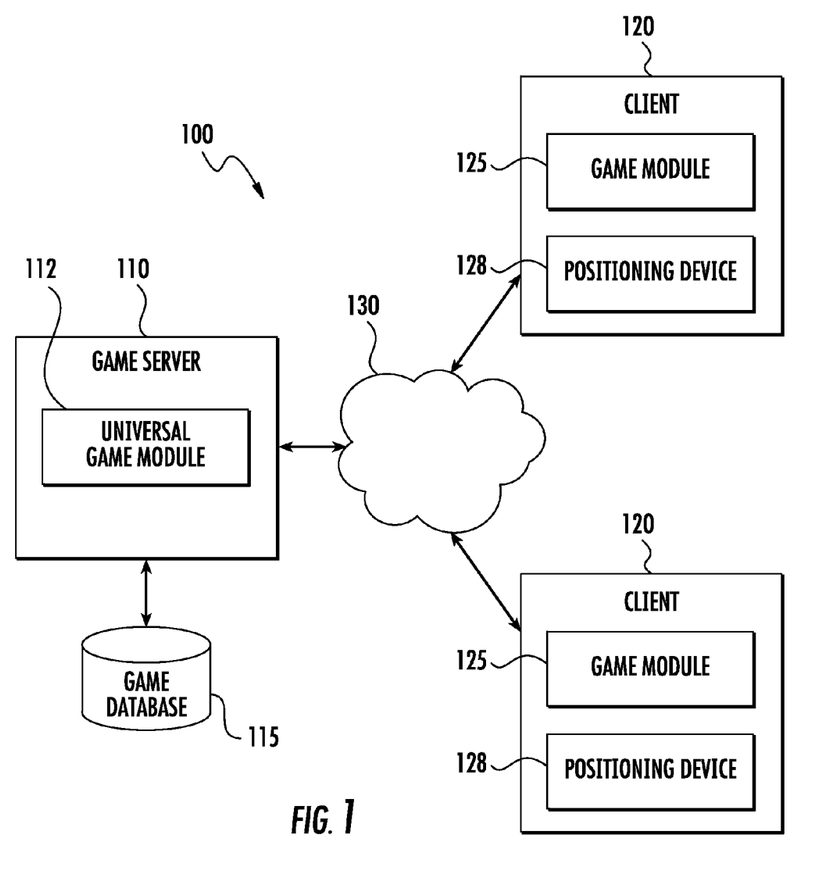
FIG. 1 depicts an exemplary computer-based system for implementing a location-based game according to an exemplary embodiment of the present disclosure.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
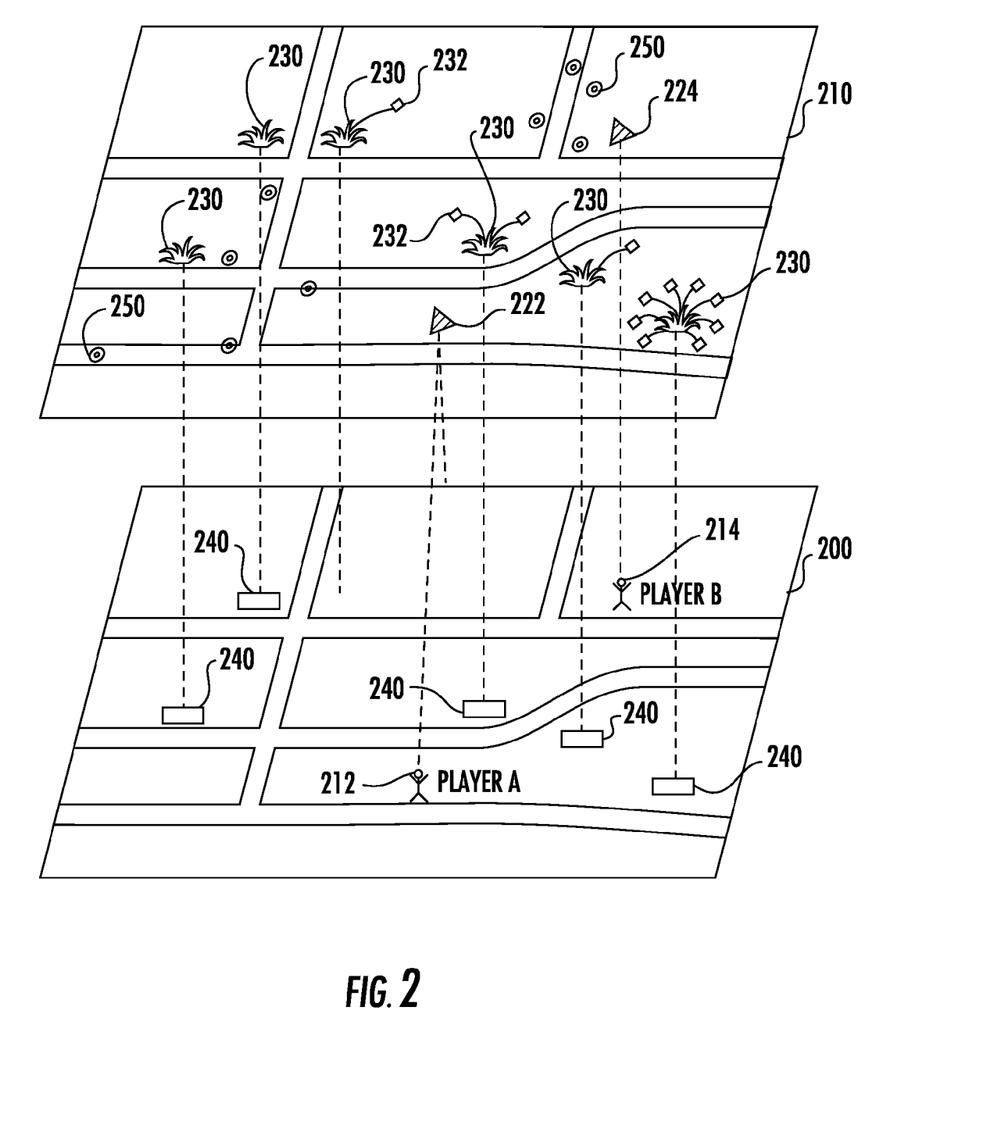
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal game module 112 that controls aspects of the location-based game for all players and receives and processes each player's input in the location based game. On the client-side, each client 120 can include a game module 125 that operates as a gaming application so as to provide a user with an interface to the system 100. The game server 110 transmits game data over the network 130 to the client 120 for use by the game module 125 at the client 120 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include one or more processors and cone or more computer-readable media. The computer-readable media can store instructions which cause the one or more processors to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

The game server 110 can be configured to receive requests for game data and other information) from one or more clients 120 (for instance, via remote procedure calls (RPCs)) and to respond to those requests via the network 130. For instance, the game server 110 can encode game data in one or more data files and provide the data files to the client 120. As will be discussed in more detail below, the game server 110 can be configured to implement one or more cross-cutting actions every time a client 120 makes an RPC call to invoke an RPC method at the game server 110.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data and information to the clients 120 over the network 130. For instance, the universal game module 112 can manage responses to calls made by game modules 125 running on client devices 120.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display with one or more processors, or other such device. In short, a client 120 can be any computer-device or system that can execute a game module 125 to allow a player to interact with the game system 100.

The client 120 can include one or more processors and one or more computer-readable media. The computer-readable media can store instructions which cause the one or more processors to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130. The network interface can include any suitable components for interfacing with one more networks, including for example, transmitters, receivers, ports, controllers, antennas, or other suitable components.

The game module 125 executed by the client 120 provides an interface between a player and the location-based game. The game module 125 can present a user interface on a display device associated with the client 120 that displays a virtual world (e.g. renders virtual world imagery) associated with the game and allows a user to interact in the virtual world to perform various game objectives. The game module 125 can also control various other outputs to allow a player to interact with the game without requiring the player to view a display screen. For instance, the game module 125 can control various audio, vibratory, or other notifications that allow the player to play the game without looking at the display screen. The game module 125 can access game data received from the game server 110 to provide an accurate representation of the game to the user. The game module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the game module 125. The game module 125 updates the player position in the virtual world based on the actual position of the player in the real world. In particular, the location of the player in the virtual world can correspond to the location of the player in the real world. The game module 125 can provide player position information to the game server 110 over the network 130 such that the universal game module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
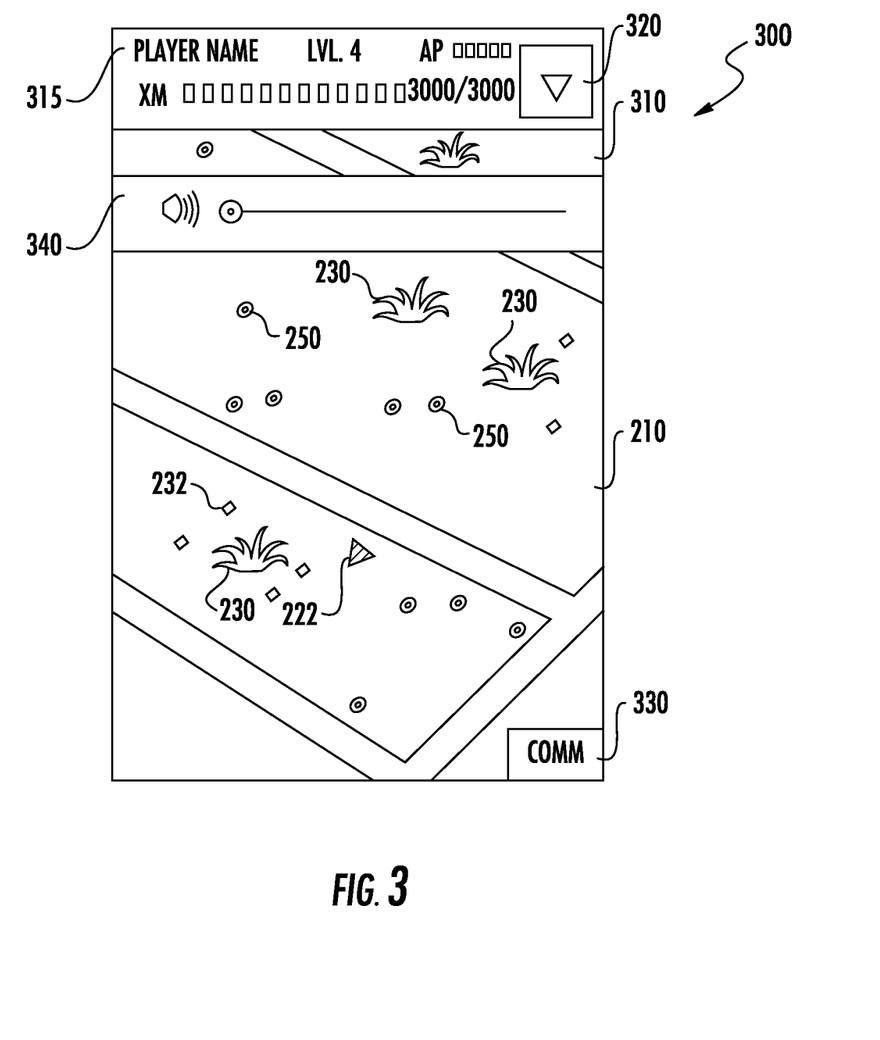
FIG. 3 depicts an exemplary game interface of a location-based game according to an exemplary embodiment of the present disclosure.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Executing Cross-Cutting Concerns for Client-Server Remote Procedure Calls

Figure 4:
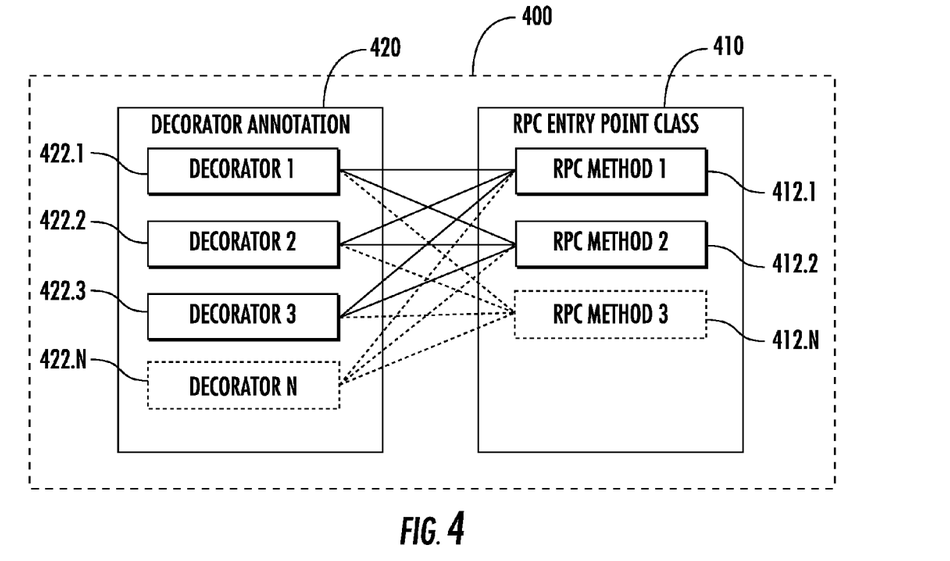
FIG. 4 depicts a diagram of annotating an RPC class with decorators according to an exemplary embodiment of the present disclosure.
Figure 5:
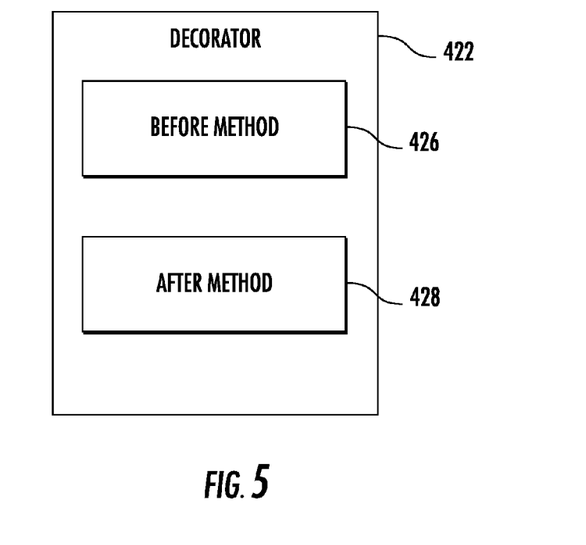
FIG. 5 depicts a diagram of an exemplary decorator used to execute a cross-cutting action in conjunction with an RPC method according to an exemplary embodiment of the present disclosure.
Figure 6:
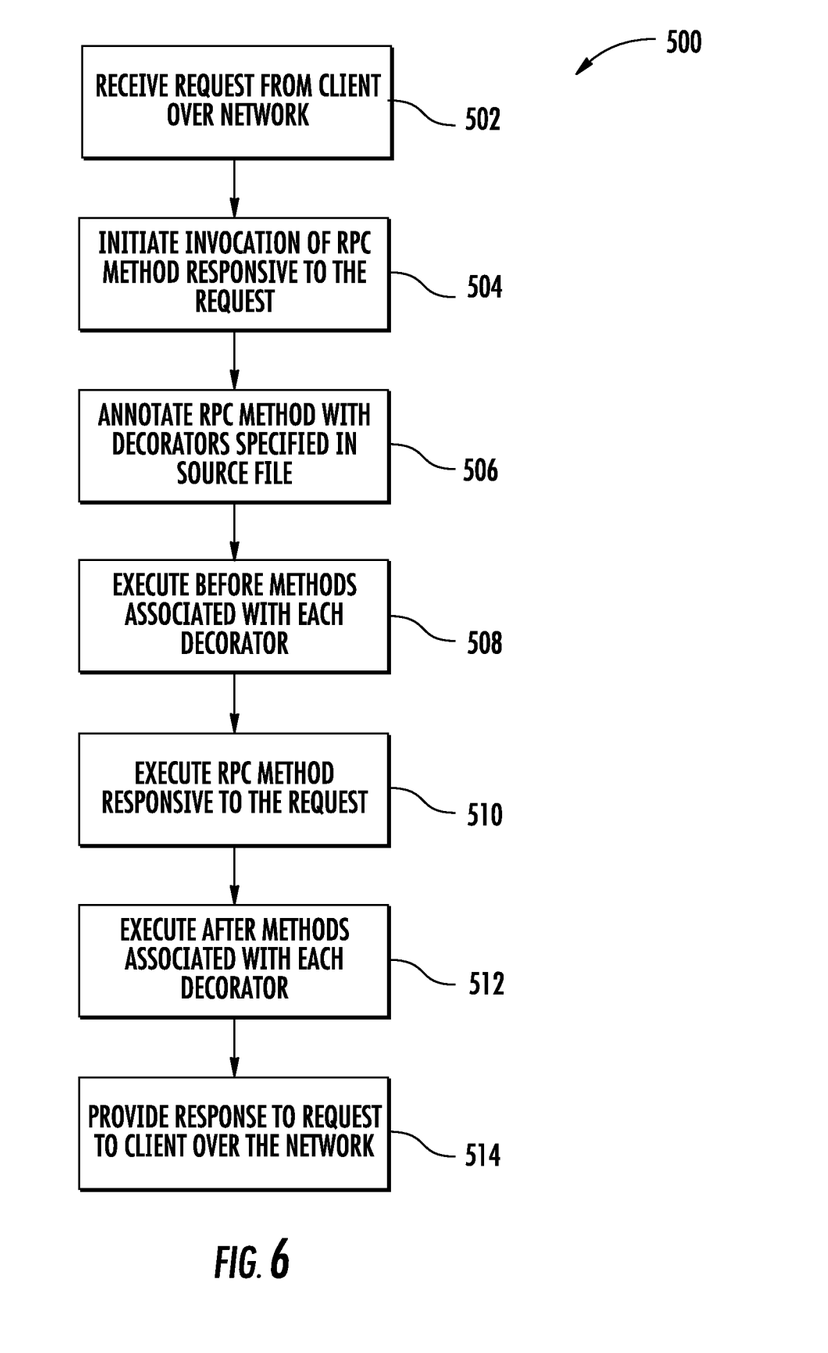
FIG. 6 depicts a flow diagram of an exemplary method according to an exemplary embodiment of the present disclosure.

With reference now to FIGS. 4-6, exemplary techniques for executing cross-cutting concerns across multiple remote procedure call (RPC) methods invoked as part of an interactive application will be set forth. The exemplary techniques for executing cross-cutting concerns will be discussed with reference to the exemplary distributed computing system 100 implementing the location-based parallel reality game depicted in FIG. 1. However, those of ordinary skill in the art, using the disclosures provided herein, should understand that the subject matter of the present disclosure can be implemented in connection with other suitable interactive applications.

FIG. 4 depicts a conceptual diagram of a source file 400 having instructions written in a programming language, such as Java, that specifies decorators for RPC methods invoked as part of the location-based parallel reality game. The source file 400 can be stored in computer-readable media at the game server 110 and can be a part of or separate from the source file specifying instructions for implementing the universal game module 112. As shown, the source file 400 includes an RPC entry point class 410 and a decorator annotation 420 associated with the RPC entry point class 410. The RPC entry point class 410 can implement an RPC entry point interface that exposes one or more RPC methods 412.1, 412.2, ..., 412.n that can be invoked at the game server 110 by remote client devices 120 pursuant to an RPC. Exemplary RPC methods can include invoking certain game actions as a result of player actions in the location-based parallel reality game, fetching game data, capturing a virtual element in response to a player action in the parallel reality game, acquiring a virtual item in the parallel reality game, completing a game objective in the parallel reality game or other suitable game action.

As shown in FIG. 4, the RPC entry point class 410 can be decorated with any number of decorators 422.1, 422.2, ..., 422.n specified in the decorator annotation 420. Each decorator 422.1, 422.2, ..., 422.n can be used to implement a cross-cutting action that cuts across multiple RPC methods in the parallel reality game. Exemplary cross-cutting actions can include recording player location, updating player energy in response to player action, recording the time of the RPC call, verifying log in information, methods directed to security and authentication, and other methods directed to concerns that cut across multiple RPC methods.

At run-time, each of the decorators 422.1, 422.2, 422.3, ..., 422.n specified in the decorator annotation 420 will be executed in conjunction with an RPC method specified in the RPC Entry Point class 410. As a result, new cross-cutting actions can be added to RPC methods specified in a particular RPC class by simply adding a decorator 422.n to the decorator annotation 420 annotating the RPC Entry Point class 410 in the source file 400. Similarly, a new RPC method 412.n added to the RPC Entry Point class 410 will automatically be decorated with each of the decorators 422.1, 422.2, 422.3, ..., 422.n in the decorator annotation 420 annotating the RPC class 410.

The decorators 422.1, 422.2, 422.3, ..., 422.n can be associated with each of the RPC methods 412.1, 412.2, ..., 412.n specified in the RPC entry point class 410 by specifying them as an annotation associated with the class 410 in the source file 400. The annotation can take an array of class constants as a parameter. For instance, in a Java Source file, decorators can be associated with RPC methods specified in an RPC entry point class as follows:

@DecorateWith({
 RecordPlayerLocation.class,
 AttackPlayerDecorator.class,
 CollectEnergyDecorator.class,})
class PlayerWithLocationEntryPoint implements RpcEntryPoint { ... }

Each decorator can be specified in the @DecorateWith decorator annotation as a decorator class. Each decorator class preferably implements a marker interface (e.g. EntryPointDecorator interface) that makes clear that classes that implement the marker interface are decorator classes. As shown in FIG. 5, each decorator 422 should also include a before method 426 and an after method 428. As will be discussed in detail below, during execution of an RPC method, the before methods associated with each decorator specified by the decorator annotation are first executed, the RPC method is then executed, then the after methods associated with each decorator in the decorator annotation are executed.

The before method 426 must be annotated in a Java source file with @Before. The after method 428 must be annotated in a Java source @After. The before methods and the after methods can be given meaningful names that describe what operations the methods perform. In a preferred implementation, an asynchronous data store query can be initiated in the before method 426 and can be completed in the after method 428. This allows for multiple operations to be happening in parallel during a particular RPC method, leading to more efficient processing.

An exemplary decorator class can be specified in a Java source file as follows:

class AttackPlayerDecorator implements EntryPointDecorator {
 AsyncOperation<ImmutableSet<PlayerDamage>>
  asyncAttackPlayer;
 @Before
 public void startDatastoreOpsForAttack( ){
  asyncAttackPlayerWithPortals=portalAttackService.asyncAttackPlayer( );
 }
 @After
 public void completeAttack( ){
  ImmutableSet<PlayerDamage>playerDamages=
   asyncAttackPlayer.execute( );
 }
}

In a particular aspect, a reflection procedure, such as Java reflection, can be used to examine all of the @Before methods in the specified decorator classes to ensure that if any of the @Before methods require parameters from a client device (e.g. player login information), that those parameters match the parameter of every RPC method in the particular RPC Entry Point Class.

FIG. 6 depicts a flow diagram of an exemplary method (500) for executing cross-cutting actions that cut across many remote procedure calls (RPCs) in an interactive application, such as location-based parallel reality game. The method (500) can be implemented using any suitable computing device, such as the game server 110 of FIG. 1. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (502), a server receives a request to invoke an RPC method from a client over a network. For instance, the game server 110 receives a request from a client device 120 over network 130 to invoke an RPC method directed to a particular game action. At (504), the server initiates invocation of the RPC method. For instance, the server can permit access to the particular RPC method being invoked based on whether the RPC method is specified in a particular RPC entry point class defined in a source file. At (506), the RPC method that is the subject of the request is annotated with all decorators associated with the RPC methods in the source file. For instance, all decorators specified in a decorator annotation associated with the RPC entry point class containing the RPC method can be applied to the RPC method. Each decorator can specify a cross-cutting action that is executed in conjunction with a plurality of RPC methods for the application.

As discussed above, the decorator can specify a before method and an after method. The before method 426 can be annotated in a Java source file with @Before. The after method 428 can be annotated in a Java source @After. In a preferred implementation, an asynchronous data store query can be initiated in the before method 426 and can be completed in the after method 428. This allows for multiple operations to be happening in parallel during a particular RPC method, leading to more efficient processing.

At (508), the method includes executing all the before methods associated with each decorator to be executed in conjunction with the RPC method. The before methods can be executed in any particular order, such as in the order of decorators specified in the decorator annotation. At (510), the method executes the RPC method responsive to the request. At (512), the method executes all of the after methods associated with each decorator to be executed in conjunction with the RPC method. The after methods can be executed in any particular order, such as in the order of decorators specified in the decorator annotation or in the reverse order of decorators specified in the decorator annotation. Finally, at (514), the method includes providing a response to the request to the client over the network. For instance, the return result obtained by invoking the RPC method is serialized and provided to the client device by sending the request over the network.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of executing cross-cutting actions across a plurality of remote procedure calls in an interactive application, comprising:
    processing a source file defining a remote procedure call class specifying a plurality of remote procedure call methods, the source file comprising a decorator annotation annotating the remote procedure call class with one or more decorators such that each of the one or more decorators applies to each of a plurality of remote procedure call methods specified in the remote procedure call class, each of the one or more decorators specifying a cross-cutting action for the interactive application; and
    executing the cross-cutting actions specified in each of the decorators in conjunction with executing at least one of the plurality of remote procedure call methods specified in the remote procedure call class
    wherein the decorators are specified in the source file in the decorator annotation annotating the remote procedure call class.

2. The computer-implemented method of claim 1, wherein the source file is a Java source file.

3. The computer-implemented method of claim 1, wherein each decorator is specified as a decorator class in the decorator annotation, each decorator class implementing a marker interface.

4. The computer-implemented method of claim 3, wherein each decorator class defines a before method and an after method associated with the cross-cutting action.

5. The computer-implemented method of claim 4, wherein the before method and the after method are specified as annotations in the decorator class.

6. The computer-implemented method of claim 4, wherein executing the cross-cutting actions specified in each of the decorators in conjunction with executing the remote procedure call method comprises:
    executing the before method defined for each decorator class specified in the decorator annotation associated with the remote procedure call class;
    subsequent to executing the before method for each decorator class, executing the at least one remote procedure call method defined in the remote procedure call class; and
    subsequent to executing the remote procedure call method, executing the after method defined for each decorator class specified in the decoration annotation associated with the remote procedure call class.

7. The computer-implemented method of 4, wherein the before method comprises initiating an asynchronous data store query associated with the cross-cutting action and the after method comprises completing the asynchronous data store query associated with the cross-cutting action.

8. The computer-implemented method of claim 1, wherein the interactive application is a location-based parallel reality game.

9. The computer-implemented method of claim 8, wherein the one or more cross-cutting actions comprise at least one or more of recording a player's location information, recording the time at which the player last connected, updating virtual energy associated with the player, updating player damage, or verifying log in information.

10. A computing device having one or more processors and one or more non-transitory computer-readable media, the one or more non-transitory computer-readable media storing computer-readable instructions for executing a plurality of remote procedure call methods for an interactive application, such as a location based-parallel reality game, the one or more computer-readable media storing a source file defining a remote procedure call class specifying a plurality of remote procedure call methods, the source file annotating the remote procedure call class with one or more decorators such that each of the one or more decorators applies to each of a plurality of remote procedure call methods specified in the remote procedure call class, each of the one or more decorators specifying a cross-cutting action for the interactive application, wherein the one or more processors are configured to execute the cross-cutting actions specified in each of the decorators in conjunction with executing a remote procedure call method specified in the remote procedure call class
    wherein each decorator is specified in the source file in the decorator annotation annotating the remote procedure call class.

11. The computing device of claim 10, wherein the source file is a Java source file.

12. The computing device of claim 10, wherein each decorator is specified as a decorator class that defines a before method and an after method.

13. The computing device of claim 12, wherein the before method and the after method are specified as annotations in the source file.

14. The computing device of claim 12, wherein the one or more processors are configured to execute the cross-cutting actions specified in each of the decorators in conjunction with executing the remote procedure call method by:

executing the before method defined for each decorator specified in the decorator annotation annotating the remote procedure call class;

subsequent to executing the before method for each decorator, executing the at least one remote procedure call method defined in the remote procedure call class; and subsequent to executing the remote procedure call method, executing the after method defined for each decorator specified in the decoration annotation annotating the remote procedure call class.

15. A tangible, non-transitory computer-readable medium storing computer-storing computer-readable instructions that when executed by the one or more processors cause the one or more processors to perform operations, the operations comprising:

processing a source file defining a remote procedure call class specifying a plurality of remote procedure call methods, the source file annotating the remote procedure call class with one or more decorators such that each of the one or more decorators applies to each of a plurality of remote procedure call methods specified in the remote procedure call class, each of the one or more decorators specifying a cross-cutting action for the interactive application; and executing the cross-cutting actions specified in each of the decorators in conjunction with executing a remote procedure call method specified in the remote procedure call class wherein the decorators are specified in the source file in the decorator annotation annotating the remote procedure call class.

16. The tangible, non-transitory computer-readable medium of claim 15, wherein each decorator is specified as a decorator class that defines a before method and an after method.

17. The tangible, non-transitory computer-readable medium of claim 16, wherein the before method and the after method are specified as annotations in the source file.

18. The tangible, non-transitory computer-readable medium of claim 17, wherein the operation of executing the cross-cutting actions specified in each of the decorators in conjunction with executing the remote procedure call method comprises:

executing the before method defined for each decorator specified in the decorator annotation annotating the remote procedure call class;

subsequent to executing the before method for each decorator, executing the at least one remote procedure call method defined in the remote procedure call class; and subsequent to executing the remote procedure call method, executing the after method defined for each decorator specified in the decoration annotation annotating the remote procedure call class.

* * * * *